Feb. 6, 1923.

J. HOFMANN.
SHOCK ABSORBER.
FILED JUNE 5, 1920.

Inventor
Josef Hofmann
by Henry Orth Jr.

Feb. 6, 1923.

J. HOFMANN.
SHOCK ABSORBER.
FILED JUNE 5, 1920.

Inventor
Josef Hofmann
by Henry Orth Jr.
Atty

Feb. 6, 1923.

J. HOFMANN.
SHOCK ABSORBER.
FILED JUNE 5, 1920.

Inventor
Josef Hofmann
by Henry Orth Jr
Atty

Feb. 6, 1923.

J. HOFMANN.
SHOCK ABSORBER.
FILED JUNE 5, 1920.

1,444,248.

Patented Feb. 6, 1923.

1,444,248

UNITED STATES PATENT OFFICE.

JOSEF HOFMANN, OF BAUMAROCHE, SWITZERLAND, ASSIGNOR TO ALFRED JOEL & CO., OF ZURICH, SWITZERLAND.

SHOCK ABSORBER.

Application filed June 5, 1920. Serial No. 386,682.

*To all whom it may concern:*

Be it known that I, JOSEF HOFMANN, a citizen of Poland, of Baumaroche, Switzerland, have invented certain new and useful Improvements in Shock Absorbers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to shock absorbers for vehicles, for use in addition to the usual body springs.

The object of the invention is to damp the vertical swing of a vehicle body due to shocks caused by the engagement of the wheels with elevations or depressions in the roadway, and the construction is such that the wheel axles or body of the vehicle shall be free to move from their normal position in either direction, but are checked or retarded in their return movement to normal position. Such action has been heretofore embodied in shock absorber construction by the throttling of a liquid through a port. Shocks producing large amplitude of movement of the vehicle running gear require a greater quantity of liquid to be passed through such ports than shocks producing small amplitude of movement.

In other words, if such port were dimensioned to cushion by leakage for heavier shocks, then the flow of liquid would be practically unrestricted in case of a light shock, and the shock absorber thus rendered inefficient. Were such a port, on the other hand, designed to effectively damp a light shock, not enough liquid could pass in proper time through said ports for a heavy shock and the device would become substantially rigid and bend or break the frame of the car.

According to my invention I obviate this difficulty, and cause variable resistance to be applied to the fluid by means of spring pressure on the rebound, effective for any degree of shock, the spring yielding to the passage of a small amount of fluid for light shocks and for a large amount of fluid for heavy shocks.

The fluid may be air, but preferably a non-freezing liquid, as oil, or I may use a purely friction device.

In order that my invention may be fully understood, I will describe the same with reference to the accompanying drawings, in which like parts are similarly designated.

Fig. 11 is a longitudinal section, and

Fig. 12 is a transverse section of a modified tructure;

Fig. 18 is a central transverse section, and

Fig. 19 is a view in side elevation in two different planes of a friction shock absorber.

Fig. 20 is a central longitudinal section, and

Referring to Figs. 1–8, the structure comprises a casting having a horizontal cylinder 1 provided with an upwardly directed cylindrical extension 2, preferably midway between the ends of cylinder 1. Webs 3, formed on the casting, are provided with bolt-holes 4 for securing the casting to the body or body frame of the vehicle. The ends of cylinder 1 are closed by nuts 5, having recesses 5ª and the top of the cylindrical extension 2 is closed by a screw-cap 6.

Figures 1, 2:
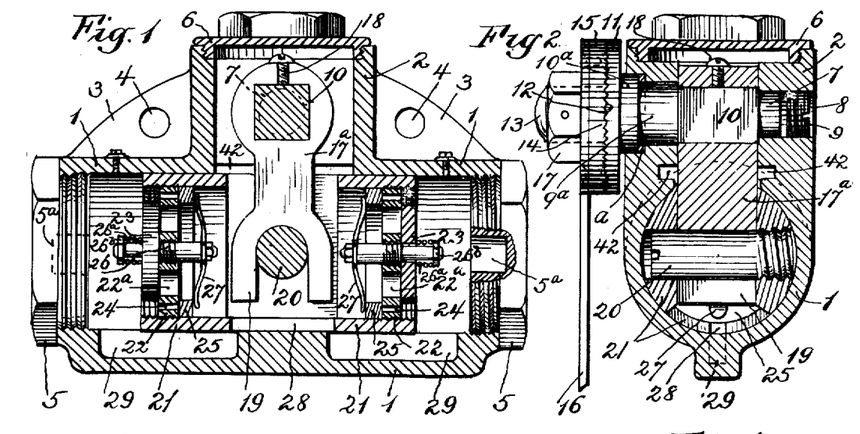
Figure 1 is a vertical central longitudinal section through one form of fluid shock absorber.
Fig. 2 is a vertical central transverse section of Fig. 1.
Figures 3, 5, 7:
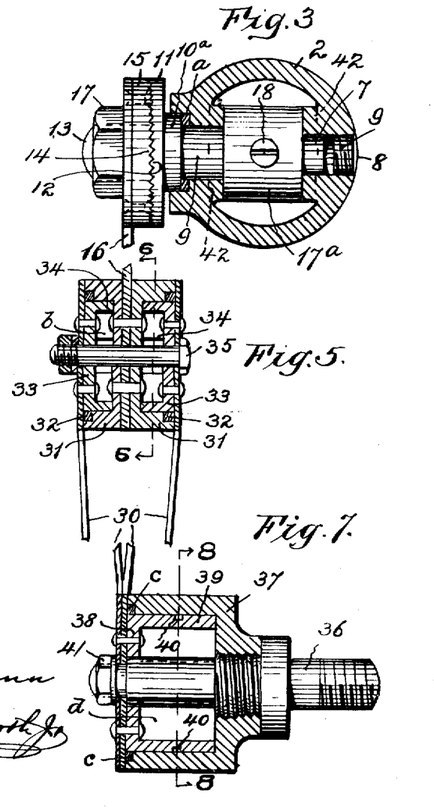
Fig. 3 is a horizontal section of Figs. 1 and 2, showing the mounting of the actuating shaft and its crank arm and lever.
Fig. 5 is a central section of the joint between the actuating lever and the link connecting the lever to the axle.
Fig. 7 is a section of the pivotal connection for the link to the axle.
Figure 4:
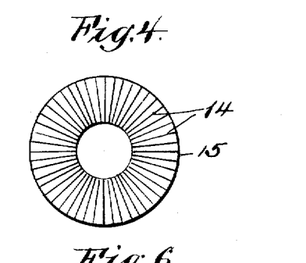
Fig. 4 is a face view of the roughened or serrated end of the actuating lever.
Figure 6:
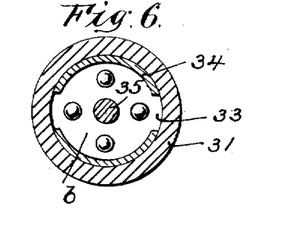
Fig. 6 is a section on line 6—6 of Fig. 5.

Passing transversely through the axis of the extension 2 is a stepped, actuating shaft 13 having a small end 7 fitting into a small bore 8 closed at its end by a screw-plug 9, a squared portion 10, a larger round portion 9ª, a packing portion 10ª for holding a leather washer, and a flange 11 having a roughened surface or radial teeth 12, that co-operate with a like roughened surface 14 on the face of a boss 15 on the end of an actuating arm 16. A nut 17 holds the boss 15 against flange 11, and the roughened surfaces 12 and 14 co-operate to prevent relative rotation of arm 16 and shaft 13. On the squared portion 10 is held a crank arm 17ª secured thereto by a set-screw 18. The lower end of the arm is forked at 19 and passes over a screw 20 in a cylindrical piston 21 whose hollow interior forms a distributing chamber.

At the middle the piston is slotted transversely of its axis to receive the forked end of the crank arm, and the two ends of the cylinder are bored and threaded for the reception of valve seats 22, each of which contains two sets of ports, the larger port 22ª controlled by disc valves 23 on one side of the seat, and the smaller ports 24 nearer the periphery of the seats controlled by ring valves 25. Each disc valve is loose on a pin 26 secured in and passing through the valve seat. On one end of pin 26 is a star spring 27, the ends of whose arms rest on the ring valve 25, and thus yieldingly hold both valves against their seats. The disc valves 23 are loose on the opposite ends of pins 26, and are held to their seats by light springs 26ª held in place by nuts 26ᵇ.

The piston has a port 28 at its bottom controlled by the cylinder wall, and the cylinder wall is provided with two longitudinal by-pass grooves 29, one on each side of the port and in line therewith.

The lower end of the actuating lever 16 is jointed to the upper end of a second lever or link 30, Fig. 5.

This joint consists of two hollow circular members 31 riveted to the end of the thin steel lever 16 and carrying leather ring washers 32. The lower lever 30 is made of two thin steel blades to each of which is riveted a member 33 having spaced arcuate flanges 34, rotatable in the circular members 31, and a bolt 35 holds the parts assembled, as shown in Fig. 5.

The construction is such that a chamber b is formed between the elements 31 and 32 for containing grease.

Figure 8:
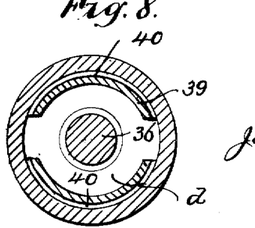
Fig. 8 is a section on the line 8—8 of Fig. 7.

The lower end of the two blades forming the second lever or link 30 are brought together and connected to a stud bearing, Fig. 7, comprising a bolt 36 on which is screwed a cylindrical member 37 open at its end and provided with a leather washer c. The ends of the blades are riveted to a disc 38 having spaced circular flanges 39, Fig. 8, provided with lubricating grooves 40. The disc and its spaced flanges are held in the cylinder 37 on bolt 36 by a nut 41. The chamber d is for the reception of grease. The bolt 36 is to be fastened on a bracket or plate connected to the vehicle axle.

The lever 16 is oscillated by the link 30, and this lever in turn oscillates the stepped shaft 13 to move the cylindrical piston 21 to displace oil in the casing 1. The casing is filled with oil by removing the cap 6, and I provide grooves 42, Figs. 1—3, for containing a surplus of oil to maintain an oil level above the piston 21 to prevent air from entering the end chambers of the cylinder 1.

In normal position of the vehicle the operating parts are related to one another as shown in Figure 1.

Upon a shock being sustained by the axle of the vehicle, lever 16 rocks shaft 13, and in so doing rocks crank arm 17ª, so as to move the piston 21, say to the right, liquid from the right hand chamber at the end of the cylinder will pass through the grooves 29 and continuously open port 28 to permit oil in the right hand end of the cylinder to pass through the distributing chamber and out through ports 22ª at the opposite end of the piston. The port 28 is open at normal position and opens wider upon movement of the piston to permit oil to pass from the right hand end of the casing through right hand groove 29 and port 28 to the distributing chamber in the interior of the piston, thence through ports 22ª at the left hand end of the piston into the left hand end of the casing. This movement from normal position is substantially free.

On excessive shock valve 25 serves as a safety valve and opens additional passages 24 to the distributing chamber.

Valve 23 by reason of its large area will open freely under liquid pressure against the action of the rather light spring 26ª. On return to normal position the piston moves toward the left and port 28 is closed against the passage of oil from outside the piston. On the left hand end all the oil must pass through the ports 24, of small area, against the action of the spring-urged valve 25 until normal position is reached, when additional oil is released into the distributing chamber through port 28 and into the opposite end of the casing, so that upon movement from normal position to the left and return the operation is the same as above described.

Figure 9:
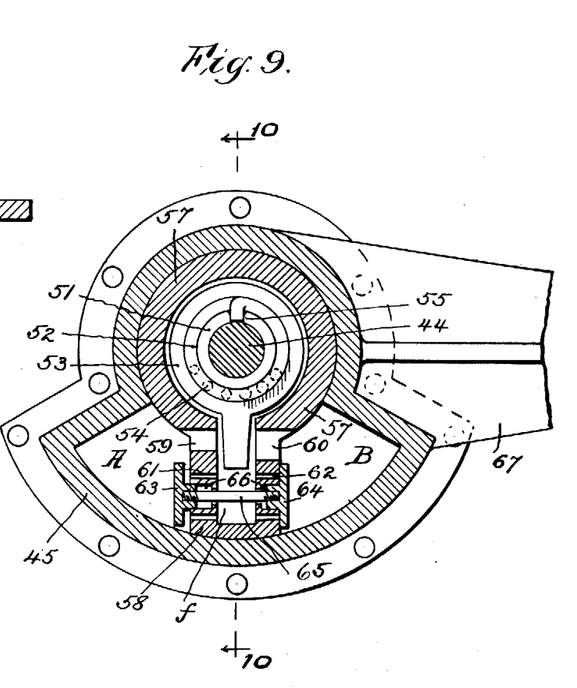
Fig. 9 is a longitudinal section on line 9—9 of Fig. 10 of a modified construction where the casing oscillates.
Figure 10:
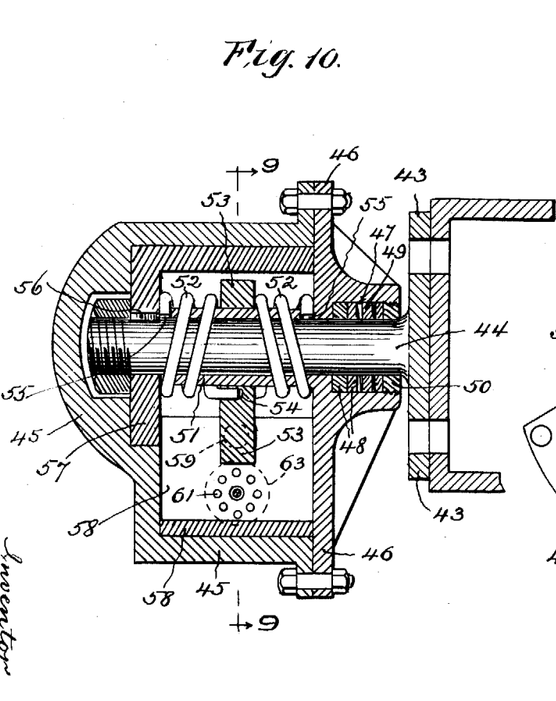
Fig. 10 is a central section on the line 10—10 Fig. 9.

In Figs. 9 and 10 the same method of operation is carried out in a shock absorber of oscillating type, the movement from normal position being substantially free, but the rebound to normal position being yieldingly checked, a coil spring being utilized for checking the flow of fluid.

I secure on the frame of the automobile a plate 43 having a pin 44 projecting therefrom. Mounted to oscillate on this pin is a fluid containing hollow casing 45 closed by a flat plate 46. The plate 46 has a recess 47 concentric with said pin containing packing washers 48, a spring 49 and a nut 50 for effecting a fluid-tight joint between the plate and pin. The plate also has a tubular portion 51 surrounding the pin.

Held on this tubular portion are a pair of springs 52 to counterbalance each other and of equal strength, between which and loose on said tubular portion is a valve member 53. This valve member 53 has a series of holes 54 in which one end of said springs engages the other end being held in holes 55 in said tubular extension 51.

The ends of the springs 52 may be placed in any one of the holes 54 in each side of the valve member 53, in order to adjust the tension of the springs to hold the valve member in its central position in the casing when not under load. Within the casing and held against rotation by a key 56 or otherwise on the pin 44 is a stationary port member having a cylindrical portion 57 inclosing the springs and a hollow depending portion 58 that divides the lower arcuate portion of the casing into two chambers A and B. In this depending portion are ports 59 and 60, which may be of the same or different sizes. These ports are controlled by a portion of the valve member 53 depending between them into the hollow portion 58 that constitutes a distributing chamber.

This hollow portion also has two sets of ports 61 and 62, the sets being controlled by disc valves 63 and 64 respectively.

The two valves are connected by a rod 65 passing through the hollow portion 58 and the chamber $f$ therein.

Each disc valve has a boss that fits into a recess 66 surrounding the rod and forms a dash-pot for retarding the movement of these valves, the leakage of liquid around the stem into and out of the recesses controlling the speed of the valves, thus preventing noise. These valves operate as a unit, so that when one opens the other closes. The casing 45 has an arm 67 extending therefrom that is connected by a link to a bracket on the axle.

When, by reason of a shock, the axle is thrown upward, the arm 67 rises, and rotates the casing 45 anti-clockwise with respect to the port member 57, disturbing the balance of springs 52 and causing the valve member which is carried by the casing to close port 60. This movement of the casing causes the displacement of liquid in chamber A, the liquid being free to flow through the large port 59 in the distributing chamber within the port member and through ports 62 into chamber B. On the return to normal position valve 62 closes and all the liquid must pass through port 60, and in so doing must overcome spring pressure exerted by the springs 52 on valve member 53. Port 60 is sufficiently large to pass a maximum quantity of oil for rapid rebound, and the amount of oil passed through this port is dependent on overcoming the spring pressure on the valve member. The oil flows into the hollow port member 58 and out through the open ports 61 and 59 until normal position is reached (as shown in Fig. 9), when port 60 is fully open. On swinging past normal position port 59 is closed and ports 61 only remain open. As the total area of ports 61 is about that of port 60, the swing past normal position is practically unchecked; then upon return to normal position again liquid from chamber A closes valve 63 and opens valve 64, the total area of ports 62 being about equal to the area of port 59. The liquid is then retarded when the device returns to normal position again by the spring-urged valve 53, this valve yielding to the liquid pressure through port 59, and the liquid passing into chamber B through the now open ports 62 and 60.

Figures 11, 12:
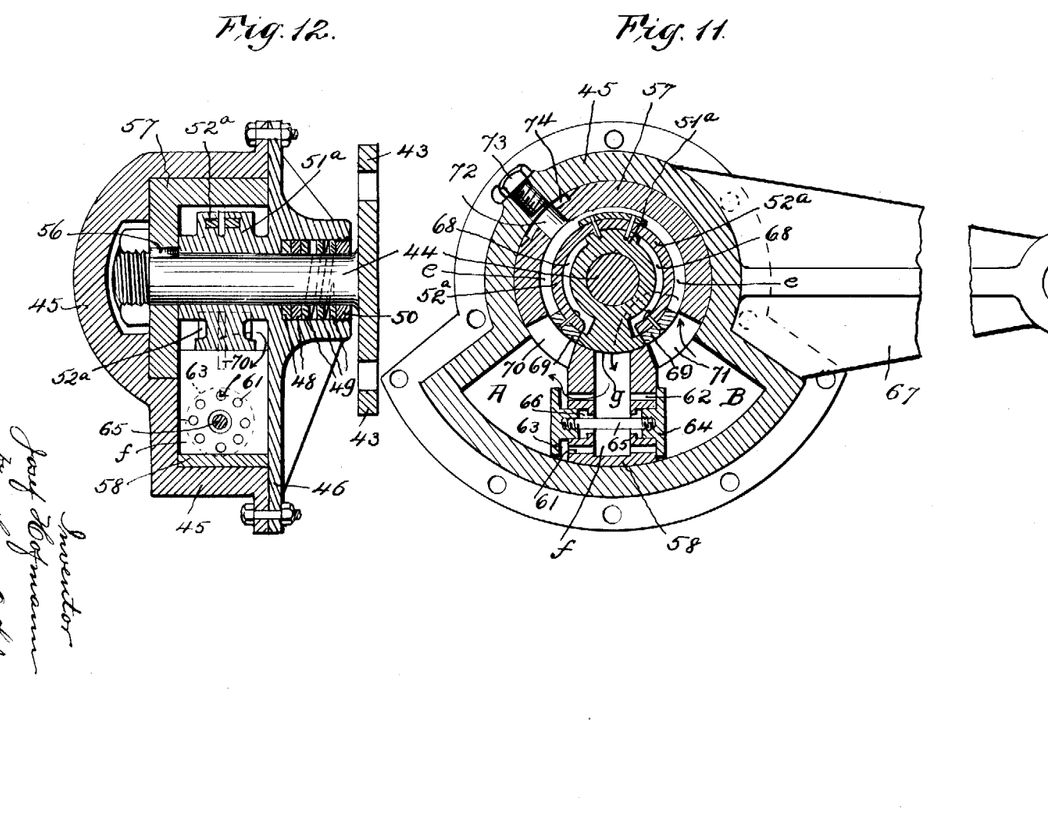

Instead of using coil springs I may use a leaf spring, as in the structure shown in Figs. 11 and 12, which show a modification of the structure shown in Figs. 9 and 10.

In this construction the sleeve $51^a$ is recessed at each side 68 to permit the movement of the ends of the leaf spring $52^a$ that carry at these ends valves 69 that control ports 70 and 71. These spring-urged valves 69 are on opposite sides of a rigid valve surface $g$ formed on the sleeve $51^a$.

I have also shown an oil filling opening 72 and screw plug 73 therefor. These are also preferably provided in the structure of Figs. 9 and 10. The opening extends through the casing and the cylindrical portion 57, of the port member. A groove 74 is provided in the portion 57, as shown, so that should the portion of the hole in the casing and that in the port member not exactly register, the device can, nevertheless, be filled with oil. The other parts of this construction are like those described with reference to Figs. 9 and 10.

Upon shock, the arm 67 moves upward, valve 63 closes and valve 64 opens. The casing 45, sleeve $51^a$, spring $52^a$ and valves 69 rotate anti-clockwise. Port 70 opens by rotation of valve 69 and oil is displaced from chamber A into the annular space $e$ and passes around the sleeve $51^a$ into the distributing chamber *f* and thence through ports 62 into chamber B. The movement of arm 67 from normal position is thus substantially unrestricted. On return to normal position port 71, which has been previously almost covered by the rigid valve surface *g* opens to the extent of the covering of this port by the spring valve 69, the oil forcing the valve from its seat. Valve 64 closes and valve 63 opens, as normal position is approached the rigid valve surface *g* uncovers more and more of the port 71 and places the port under the action of an increasing area of the spring valve, thereby decreasing the resistance of this valve to liquid pressure by reason of the increasing area subjected to said pressure. The oil passes into the chamber *e* thence to distributing chamber *f* through ports 61 back into chamber A.

The operation from normal position clockwise and back to normal, is the same as described for anti-clockwise movement.

Figure 13:
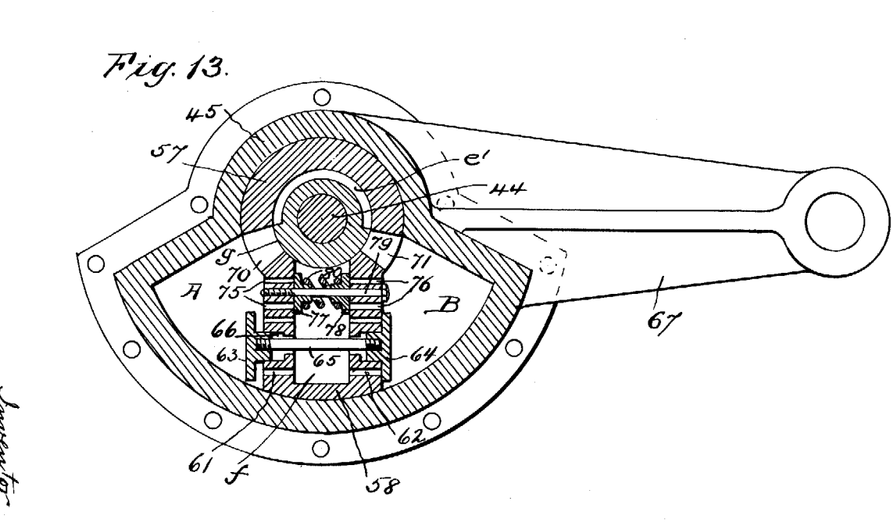
Fig. 13 is a longitudinal section of a similar construction employing a spring not partaking of oscillation.

In Fig. 13 is shown a further modification, in which the spring is not oscillated by the arm, and in which there are three sets of ports in duplicate instead of two in duplicate, as before.

In this construction the rigid valve surface *g* controls the ports 70 and 71, and in addition to these ports I provide in chamber *f* other ports 75 and 76. These ports are controlled by two valves 77 and 78 in chamber *f* sliding on a bolt 79 that is secured in member 58 with a coil spring 80 between them.

The operations are in all respects similar to those of the two previously described constructions.

As port 70 is uncovered, oil passes from chamber A to chamber *e'*, chamber *f*, and through ports 62 into chamber B. Excessive movement is permitted by the opening of valve 77. On the return of arm 67 to normal position port 71 remains closed until normal position of the parts is reached, and the oil passes through the ports 76 against the action of the spring-pressed valve 78 into chamber *f*, thence through ports 61 and port 70 into chamber A. As soon as normal position is passed port 71 opens at progressively increasing areas, relieving the valve 78, and permitting substantially free movement past normal position. The clockwise operation is the same as described for anti-clockwise movement.

Figure 14:
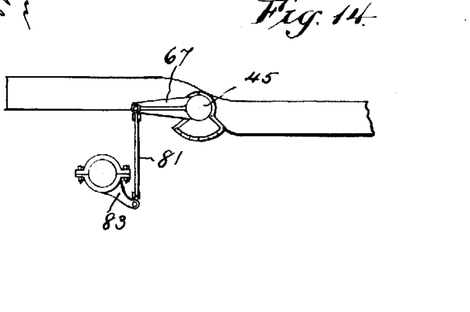
Figs. 14 and 15 are views showing the manner of mounting the shock absorbers.
Figure 15:
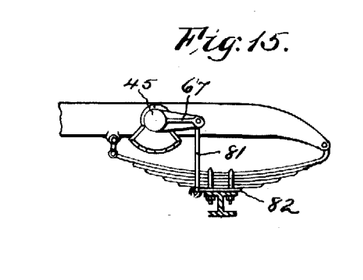

The constructions Figs. 9–13 are connected to the rear and front of the vehicle, as indicated in Figs. 14 and 15.

The arm 67 is connected to a rod 81 whose two ends have universal connection, the upper end with arm 67 and the lower either with a plate 82 lying under the vehicle spring or a bracket 83 connected to the axle.

Thus far I have shown constructions embodying my invention in which a shaft or sleeve is oscillated, but the construction of some automobiles does not allow of connection of such shock absorbers with facility, and the reciprocating type would be easier to install.

Figure 16:
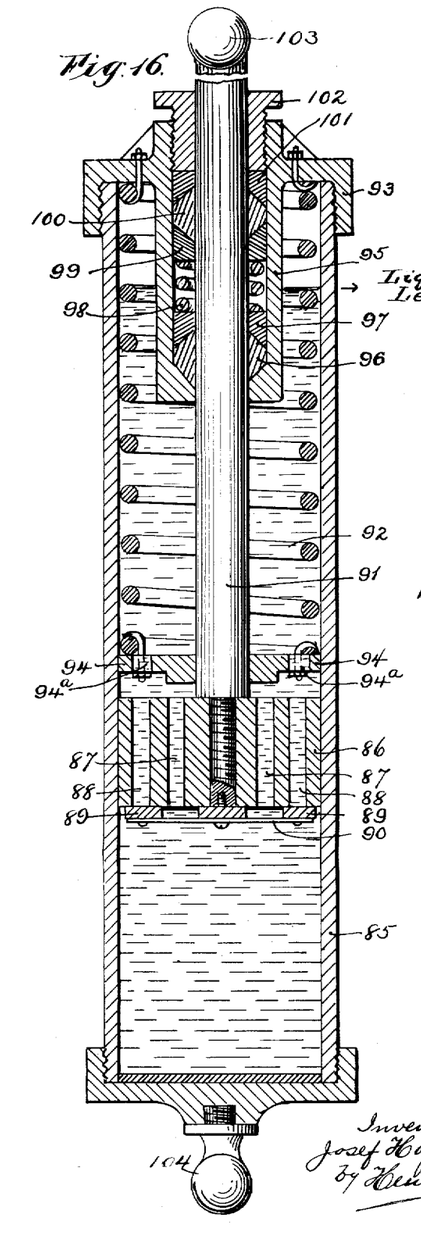
Figs. 16 and 17 are vertical central sections of a reciprocating type of shock absorber.

In Fig. 16 I have shown such a type in vertical section, in which 85 is a cylinder having a piston 86 therein, having ports 87 controlled by valve 94 and ports 88 controlled by valves 89 urged to close said ports by a spring 90. Surrounding the piston rod 91 is a coil spring 92 secured to the cylinder cover 93, and secured to the lower end of this spring is a valve 94 having ports 94$^a$ that register with the ports 88 in the piston.

When the shock absorber is in normal position the spring 92 is not under compression and supports the valve 94 away from the ported piston 86.

The piston rod passes through a stuffing box 95 that contains a packing 96, a shoe 97 for compressing the packing, a spring 98, a shoe 99, a packing 100, a shoe 101 and a gland 102. By screwing the gland into the stuffing box the tension of the spring 98 between the two sleeves 97 and 99 can be increased to increase the pressure on both packings 96 and 100.

The piston rod terminates in a ball 103, and the cylinder has a ball 104 or the equivalent, for a universal connection to the vehicle. The cylinder is filled with liquid, oil, to about the level indicated.

In operation, when the cylinder is forced upward by a shock, the oil passes from below the piston through the ports 87, the spring and valve 94 being carried upward with the cylinder. On the return movement cylinder 85 moves down relatively to the piston, and oil passes through both sets of ports 88 and 87, until the valve 94 contacts with the piston just beyond normal position and closes ports 87, so that the oil above the piston must pass through the registering ports 88 and 94$^a$ against the action of the spring-urged valve 89, which being very light causes but little resistance. Upon returning again to normal position valves 89 close, and the oil is forced through ports 87 against the action of the heavy spring 92 on valve 94.

In other words, the movement of the cylinder upward from its normal position and its return to normal position is unrestricted, and so is, substantially, its downward movement from normal position (as shown in Fig. 16). The return movement (upward) to normal position, however, is efficiently yet yieldingly retarded, as all the liquid below the piston must pass through ports 87 overcoming the pressure of the heavy spring 92, ports 88 being then closed. As the pressure of spring 92 diminishes and becomes zero at normal position, the resistance offered to the flow of liquid will correspondingly diminish. This structure, because of the "one way throttling," is but single acting.

Figure 17:
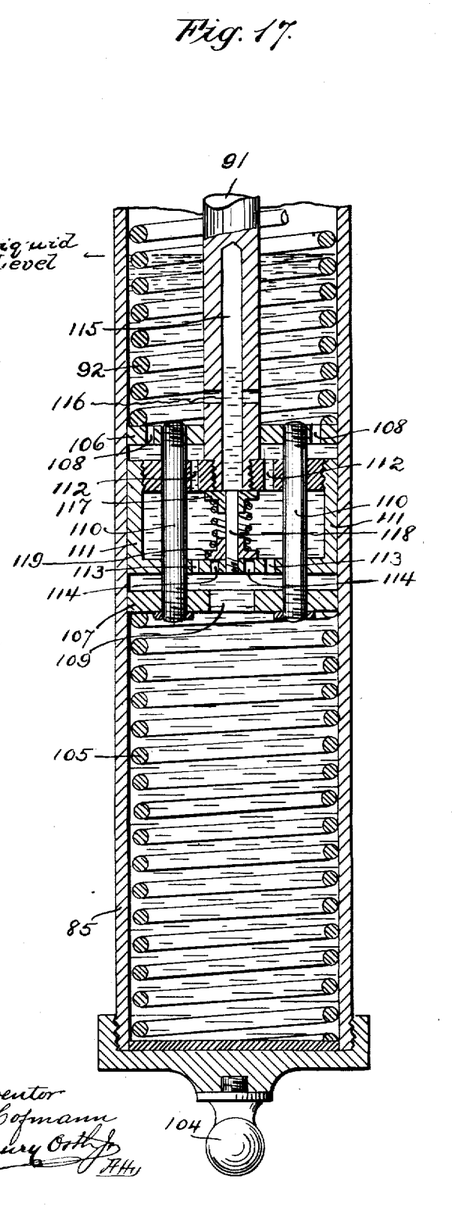

A double acting construction is shown in Fig. 17 where two counterbalanced coil springs 92 and 105 are used. Each spring engages a valve, 106 and 107. The valve 106 has ports 108, and the valve 107 has a single large port 109. The valves are connected together by rods or bolts 110 that pass through a hollow piston 111 forming a distributing chamber on the end of the piston rod 91. The upper wall of the piston has a series of ports 112 and the lower wall has two sets of ports 113 and 114. The piston rod has a bore 115 that communicates with the oil space in the cylinder above the valve 106 through holes 116. The lower end of the bore communicates with the interior of the piston and is controlled by a valve 117 loose on a pin 118 secured in the bottom wall of the piston. This pin also has a valve 119 loose thereon controlling the ports 114.

Assuming that the piston moves upward from normal position, the counterbalance of springs 92 and 105 will be disturbed, the piston will contact with valve 106 and compress spring 115, and the liquid will flow from above the piston through holes 116, bore 115, past valves 117 into the distributing chamber within the interior of the piston, thence through ports 113 and port 109 into the lower part of the cylinder. On the return movement the piston descends with valve 106 pressed tightly thereto and valve 117 remains closed by liquid pressure, so that liquid from the bottom of the cylinder must pass by ports 109, 113 and 114 into the piston chamber and thence through ports 112 against the progressively decreasing pressure of the strong spring 92 on valve 106. Upon reaching normal position the parts assume the position shown in Fig. 17. Then as the piston moves down past normal position, the piston contacts with the lower valve 107, closes port 113, and liquid flows by port 109 and ports 114 past valve 119 into the piston chamber, and through the ports 112 and 108, into the chamber above the piston.

On the rebound to normal position, valve 119 is held closed by liquid pressure, and the spring 105 holds the valve 107 against the ports 113 of the piston, so that liquid from above the piston must pass through the ports 113 past the strongly pressed spring-urged valve 107, whereby the rebound is more strongly, but yieldingly checked.

Figures 18, 19:
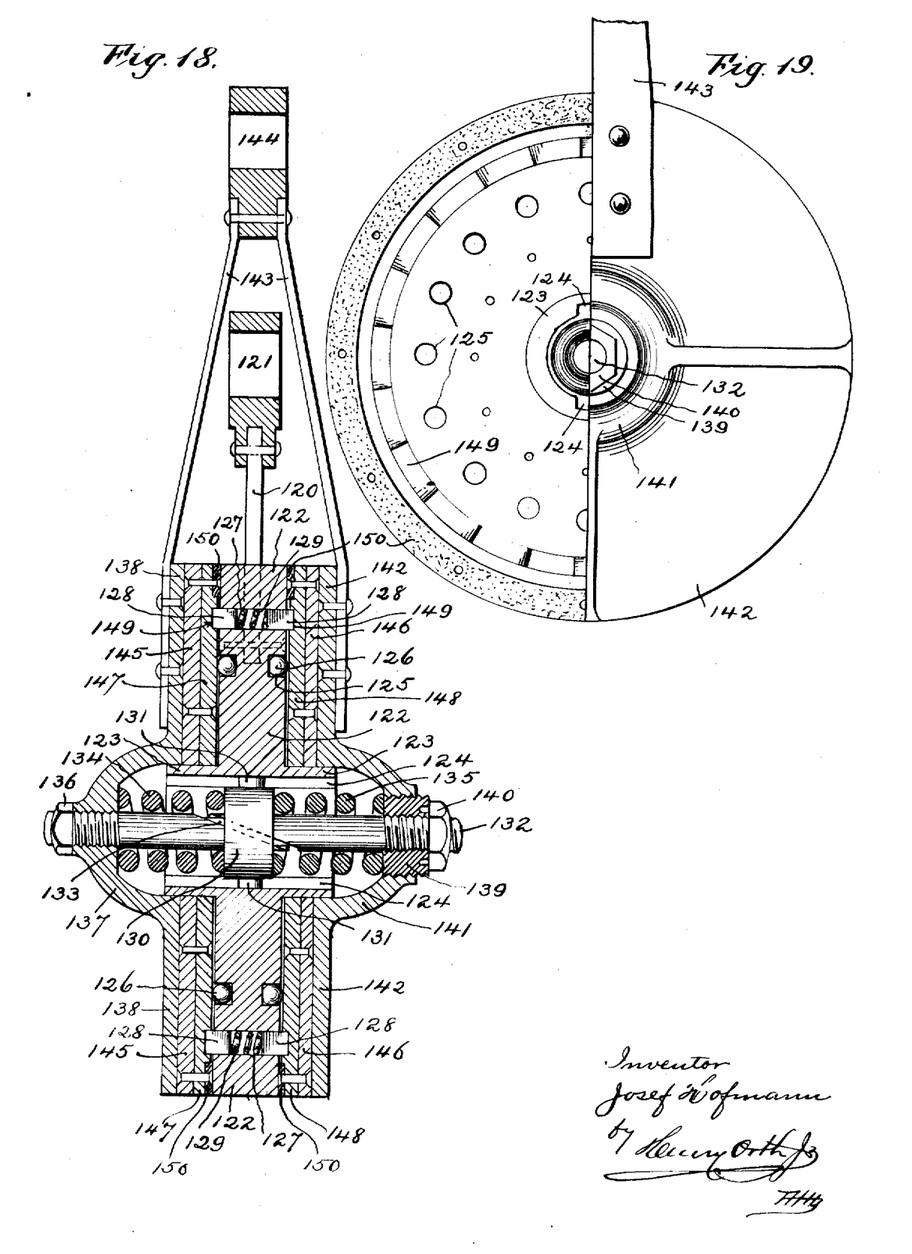

The same result may be attained with the friction mechanism illustrated in Figs. 18 and 19, in which a steel blade 120 provided with an attaching eye 121 is secured to a circular body 122. This body has a central circular flange 123 projecting from each side around a central bore provided with internal slideways 124. The face of this body is provided with seats 125 for anti-friction balls 126 and near its periphery is provided with longitudinal perforations 127, each containing a pair of pawls 128 with a spring 129 between them.

Within the central bore is a nut 130 having lugs 131 guided in grooves 124. This nut is on a central pin 132 having a high pitch groove 133 engaged by said nut. On each side of the nut on said pin is a coil spring, 134 and 135 respectively, counterbalancing each other. One end of the pin 132 is locked by a nut 136 in a casing member 137 having a wide circular flange 138. The other end of the pin is locked in a capstan nut 139 by a nut 140. The capstan nut is in a casing member 141 having a circular friction flange 142 co-extensive with the flange 138. Connected to these two flanges are steel blades 143 secured to an eye 144 for attaching the device to the vehicle.

Loose on each central flange 123 is a friction plate, 145 and 146 respectively, and riveted or otherwise secured to each friction plate is a circular rack plate 147 and 148 respectively. Each of these plates has rack teeth 149 arranged for engagement by the pawls 128, and carries felt or leather washers, 150.

The casing portion containing the springs 134 and 135 and nut 130 may be packed with grease or not.

Assume that eye 144 is attached to the body of an automobile, and the eye 121 to the axle, and the axle subjected to shock moves toward the frame; this will result in moving nut 130 to the right, will compress spring 135 and permit spring 134 to expand. At the same time friction flange 138 will be relieved of the pressure of spring 134, and being then subjected to the increased pressure of spring 135, will contact with plate 145. The pawls 128 will ride idly over the circular racks 149 on place 145. Casing 141 will be moved slightly to the right and relieve the friction between flange 142 and friction plate 146, so that the pawls engaging the rack on this plate will drag this plate idle around. Upon the return movement to normal position, the friction plate 145 which is now strongly pressed by flange 138 will be carried by its pawls into frictional contact with said flange, the nut 130 at the same time moving to the left and gradually relieving the friction by compressing spring 134 and relieving the excessive pressure of spring 135, when the friction will be entirely relieved at normal position.

On passing normal position, the nut 130 continues to move to the left of its middle position, overcomes the balance of the two springs 134 and 135, compresses spring 134 and relieve spring 135, and the whole casing moves slightly to the left, causing frictional contact between flange 142 and plate 146, the pawls 128 riding over the rack of plate 148 and the pawls engaging the rack of plate 145 carrying said plate idly.

On the rebound, the right hand pawls 128 engage the rack of plate 148, now strongly pressed by flange 142, and retard the rebound. At the same time nut 130 travels to the right again and relieves the pressure by moving the casing to the right under the compressing action on spring 135 until normal position is again reached, when the friction pressure is entirely relieved.

The racks of the two plates have their teeth oppositely directed.

The object of all the specified structures is the same: to permit free movement of the axle or the body of the car in either direction, but at all speed effectively yet yieldingly check their return to normal position.

Figure 20:
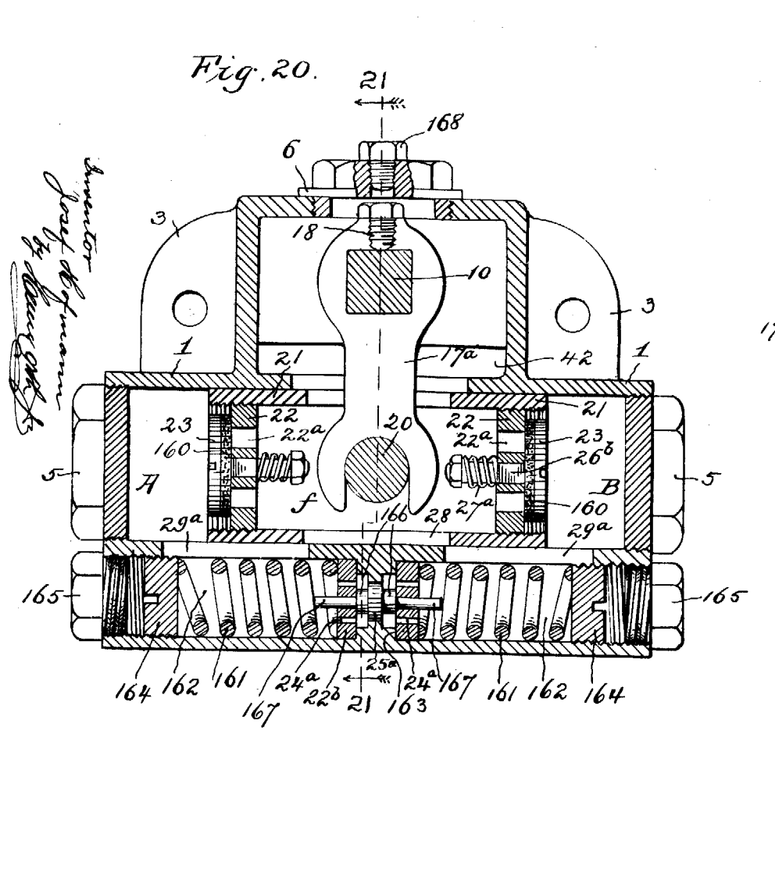
Figure 21:
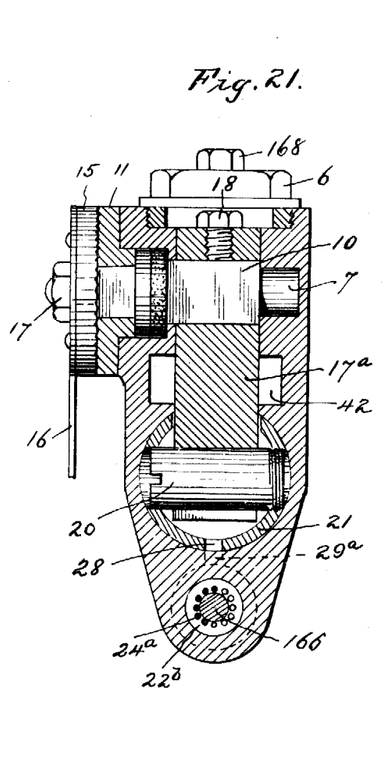
Fig. 21 is a cross-section on line 22—21 Fig. 20 of a modification of the structure shown in Figs. 1 and 2.

In the construction shown in Figs. 20 and 21, I have illustrated a modification of the structure shown in Figs. 1 and 2, operating on the same principle, but with the advantage of being able to adjust the shock absorber to various loads, such as different weight of vehicle bodies, or excessive loads on any one body, and to this end the valve 25$^a$ controlling the passage of liquid from one end chamber B to the other end chamber A and vice versa is under the control of separate adjustable springs 161, much stronger than the springs 27$^a$ controlling the valves 23.

The valves 23 have a square pin 26$^b$ and are provided with leather washers 160 to eliminate the seating noise of the valves.

The valve 25$^a$ is a piston valve located between the cylindrical by-pass chambers 162 corresponding to grooves 29, Fig. 1. Between these chambers is a port abutment 163 against the opposite ends of which seat the port blocks 22$^b$ having the ports 24$^a$. Against each port block 22$^b$ bears one end of the heavy coil spring 161 whose other end bears against a screw plug 164 in threaded engagement with its chamber 162. Each chamber is closed by a screw plug 165.

The piston valve 25$^a$ has a reduced portion 166 on each side thereof from each of which portions extends a valve stem 167 having bearing in its adjacent port-block.

Instead of having a filling opening closed by a screw for each end chamber A and B, as in Fig. 1, I provide a single liquid filling opening closed by a screw 168 in the screw-cap 6.

The operation of this construction is as follows:

Assuming that the hollow piston 21 moves toward the left into chamber A from its neutral or normal position shown in Fig. 20; port 28 at the bottom of the piston will be covered and the right-hand by-pass slot 29$^a$ closed and the left-hand by-pass slot 29$^a$ will be opened to a greater extent, thereby admitting liquid from chamber A through slot 29$^a$ at the left end into the left-hand by-pass chamber 162, thence through slot 28 into the distributing chamber $f$ within the piston 21. The liquid coming into this chamber passes through the ports 22$^a$ into the chamber B forcing open the valve 23 against the action of its light spring 27$^a$.

Upon the return movement to normal position (toward the right) slot 29$^a$ on the right remains closed to the distributing chamber $f$ and liquid must by-pass from chamber B through right-hand chamber 162 ports 24$^a$ in its port block 22$^b$ and move piston valve 25$^a$ past its seat against the action of spring 161 on the left.

The shoulder formed by the reduced portion 166 on the valve moves the port-block at the left against the action of the storage coil spring 161.

The liquid passes into the left-hand chamber 162 through port 28 into the distributing chamber $f$ and then through the ports 22$^a$ into chamber A. When normal position is reached both chambers 162 may communicate with the distributing chamber $f$ by reason of the two slots 29$^a$ registering at their adjacent ends with the ends of the slot or port 28. The operation upon movement of the piston 21 to the right from normal position is identical, as both ends of the device embody like structure.

I claim—

1. Method of controlling the reactions of the body of a vehicle by first permitting the axle to move freely from its normal position in either direction, then applying on the return movement to normal position a yielding yet at all speeds an effective braking resistance.

2. Method of controlling vehicle springs, which comprises absorbing vibrations thereof by first permitting a free movement of the spring from normal position in either direction, then applying progressively decreasing yielding resistance to the return to normal position.

3. The method of controlling vehicle springs by absorbing vibrations thereof by the displacement of a fluid, which comprises allowing substantially free displacement of the fluid upon movement of the springs from normal position, and yieldingly retarding the displacement of the fluid upon the return of the springs to normal position to maintain a substantially constant resistance to the flow of fluid at all speeds.

4. The method of controlling vehicle springs by absorbing vibrations thereof by displacement of a liquid, which comprises allowing substantially free displacement of the liquid upon the movement of the spring from its normal position, and yieldingly retarding such displacement upon the movement of spring to normal position while progressively increasing the volume of liquid being displaced.

5. In a shock absorber having a member for attachment to a vehicle body and a second member for connection with an axle thereof and movable relatively to the first member; the combination with means interposed between the two members to permit free movement of said members in either direction from their normal position, said means applying resistance at the end of such free movement irrespective of its extent, and yieldingly retarding the return of said members to normal position, at all speeds of operation.

6. In a shock absorber having a member for attachment to a vehicle body and a second member for attachment to the axle thereof and movable relatively to the first member; the combination with spring-actuated means interposed between the two members permitting substantially free movement of said members relatively to each other in either direction from normal position and then applying spring resistance at the end of said movement to retard the movement of said members to normal position, at all speeds of operation.

7. In a shock absorber, a member for connection to a vehicle body and a second member for connection to a vehicle axle and movable relatively to said first member, one of said members constituting a liquid container and the other member ported, and mechanically separating the other member into two liquid containing chambers, and a spring-urged valve controlling the ported member and the passage therethrough of the liquid from one chamber to the other.

8. In a shock absorber, two members one of which is substantially stationary and the other of which is movable, one of said members constituting a liquid container and the other member dividing said container into two chambers, and means to permit the passage of liquid from one chamber to the other, and spring valve-controlled ports operating to control by spring pressure the passage of a portion of the liquid from one chamber to another.

9. In a shock absorber, a cylinder, a hollow piston therein, a port in said piston controlled by said cylinder to permit the passage of liquid from one end of the cylinder through the hollow piston to the other end of the cylinder, and spring-held valves in the ends of the piston opened by liquid pressure.

10. In a shock absorber, a cylinder, a hollow piston therein having two sets of ports in each end, the total area of one set of ports being greater than the total area of the other set of ports, a valve for each set of ports and a spring common to said valves.

11. In a shock absorber, a cylinder, a hollow piston therein having two sets of ports in each end, the total area of one set of ports being greater than the total area of the other set of ports, a valve for each set of ports and a spring for said valves, said piston having a slot between its ends controlled by the cylinder wall.

12. In a shock absorber, a cylinder having two longitudinal alined grooves separated by a portion of the cylinder wall, a hollow piston having two sets of ports in each end, a ring valve controlling one set of ports, a disc having a stem and controlling the other set of ports, a spring on said stem and engaging the ring valve, means for reciprocating said piston and a port in the piston controlled by said cylinder wall portion.

13. In a shock absorber, a cylinder having two longitudinal liquid circulating grooves separated by a portion of the cylinder wall, a hollow piston having two sets of ports in each end, said sets of different total area, a ring valve on one side of each piston end controlling one set of ports and a disc valve on the other side controlling the other set of ports, a stem on said disc valve passing through the piston end, and a star spring on said stem engaging the ring valve, a slot in the piston controlled by said cylinder portion, and a crank arm for reciprocating the piston.

14. In a shock absorber, a cylinder, screw plugs closing the ends of the cylinder, a cylindrical extension at right angles to the axis of the cylinder, a screw plug closing said extension, a hollow piston in said cylinder, a crank arm mounted in said extension and operatively engaging the piston, and valves in the piston controlling the displacement of liquid from one end of the cylinder through the hollow piston to the other end of the cylinder.

15. In a shock absorber, a cylinder, a piston therein, a crank arm for actuating said piston, a shaft on which said crank arm is mounted having a rough faced flange, a rough faced eye secured to said disc, an actuating arm secured to said eye, a link connected to the other end of said arm, said connection comprising interfitting cylindrical elements co-operating to form grease containing chambers.

16. In a shock absorber, two co-operating members, one of which is movable and the other stationary and one of said members constituting a liquid container and the other member ported and mechanically separating the first member into two liquid containing chambers, and a normally closed spring valve controlling the ports and the passage therethrough of the liquid from one chamber to the other and vice versa.

17. In a shock absorber, two co-operating members, one of which oscillates about a centre and the other is stationary, and one of said members constituting a liquid container and the other member ported and mechanically separating the first member into two liquid containing chambers, and a spring valve controlling the ports and the passage therethrough of the liquid from one chamber to the other and vice versa.

18. In a shock absorber, two co-operating members, one of which is movable and the other stationary, one of said members constituting a liquid container and the other member ported and mechanically separating the first member into two liquid containing chambers, and a spring valve positively operated by the movement of the movable member controlling the ports and the passage therethrough of the liquid from one chamber to the other and vice versa.

19. In a shock absorber, two members, one of which oscillates and the other is stationary relative thereto, one of said members constituting a liquid container and the other member mechanically separating the first member into two liquid containing chambers and having substantially non-throttling ports therein permitting the passage back and forth between the two chambers, and a spring-actuated valve to control said ports.

20. In a shock absorber, two members, one of which oscillates and the other is stationary relative thereto, one of said members constituting a liquid container and the other member mechanically separating the first member into two liquid containing chambers and having substantially non-throttling ports therein permitting the passage back and forth between the two chambers, and a spring-actuated valve positively operated by the movement of the oscillating member to control said ports.

21. In a shock absorber, two members, one of which is movable and the other stationary, one of said members constituting a liquid container and the other member dividing the liquid container into chambers and having spring valve controlled ports through which the liquid may pass back and forth between the chambers.

22. In a shock absorber, two members one of which oscillates and the other is stationary, one of said members constituting a liquid container and the other member mechanically separating said container into two chambers and having two ports presenting different pressure areas and permitting the passage of liquid back and forth between the chambers, said ports being spring valve controlled.

23. In a shock absorber, two members one of which oscillates and the other is stationary, one of the members constituting a liquid container and the other member mechanically separating the container into two chambers and having within said other member a receiving and distributing chamber provided with spring valve controlled ports permitting passage of liquid between the several chambers.

24. In a shock absorber, two members one of which oscillates and the other is stationary, one of the members constituting a liquid container and the other member mechanically separating the container into two chambers, and having within said other member a receiving and distributing chamber provided with spring valve controlled ports positively opened and closed by the movement of the movable member, permitting passage of liquid between the several chambers.

25. In a shock absorber, two members, one of the members constituting a liquid container and the other member mechanically separating the container into two chambers, and having within said member a receiving and distributing chamber having substantially opposed ports and a valve common to both of said ports and connected to the container member, whereby the oscillation of one of the members will cause the positive opening and closing of said ports.

26. In a shock absorber, two members, one of the members constituting a liquid container and the other member mechanically separating said container into two chambers and having a receiving and distributing chamber therein provided with substantially opposed ports, a valve common to both of said ports opposed springs under stress holding said valve in non-controlling position when the shock absorber is idle, and means for oscillating one of the members thereby causing the valve control of said ports.

27. In a shock absorber, two members, one of the members constituting a liquid container and the other member mechanically separating said container into two chambers and having a receiving and distributing chamber therein provided with substantially opposed ports, a valve common to both of said ports, opposed springs under stress balancing one another and holding said valve in non-controlling position when the shock absorber is idle, and means for oscillating one of the members thereby causing the valve control of said ports.

28. In a shock absorber, two members, one of the members constituting a liquid container and the other member mechanically separating the container into two chambers having a port therein, a valve controlling the port, and a spring connecting the valve and container, and means to oscillate one of the members thereby causing the valve control of said port.

29. In a shock absorber, two members, one of the members constituting a liquid container and the other member mechanically separating the container into two chambers and having a port therein to permit circulation of liquid back and forth between the chambers, a spring valve for said port connected to the first member and positively controlling the port upon the movement of one of the members, and an auxiliary liquid-operated check valve controlled port also in said other member, said valves operating upon the movement of either member.

30. In a shock absorber, two members, one of the members constituting a liquid container and the other member having a receiving and distributing chamber separating said container into two chambers, substantially alined ports through the walls of said receiving and distributing chamber adjacent the container chambers, a spring valve within the receiving and distributing chamber connected to the container member and common to said ports, auxiliary ports in the latter chamber for the passage of liquid to the container chambers, and a pair of connected check valves to control the latter ports.

31. In a shock absorber, two members, one of the members constituting a liquid container and the other member having a receiving and distributing chamber separating said container into two chambers, substantially alined ports through the walls of said receiving and distributing chamber adjacent the container chambers, a spring valve within the receiving and distributing chamber connected to the container member and common to said ports, auxiliary ports in the latter chamber for the passage of liquid to the container chambers, a pair of connected check valves to control the latter ports, and means to produce a liquid retarding of the movement of said check valves and thereby prevent their knocking.

32. In a shock absorber, two members, one of the members constituting a liquid container and the other member having a receiving and distributing chamber separating said container into two chambers, substantially alined ports through the walls of said receiving and distributing chamber adjacent the container chambers, a spring valve within the receiving and distributing chamber connected to the container member and common to said ports, auxiliary ports in the latter chamber for the passage of liquid to the container chambers, a pair of connected check valves to control the latter ports, and liquid throttling chambers arranged adjacent each check valve to retard their movement.

33. In a shock absorber, two members, one of said members constituting a liquid container and the other member mechanically separating the container into two chambers of variable volume and having a port therein to permit circulation of liquid between the two chambers, a movable cover for the container, a spring valve connected to said cover for co-operation with said port and operating to control the port upon the movement of one member with respect to the other, said cover and valve removable as a unit.

34. In a shock absorber, a casing having friction surfaces, a member rotatable between said surfaces, means operated by said member to move said friction surfaces laterally, and loose friction plates between said member and surfaces, and means on said member to alternately rotate said plates when frictionally engaged.

35. In a shock absorber, a cylinder, a hollow piston therein, valves at the ends of the piston, a port in said piston controlled by said cylinder, two by-pass chambers each capable of piston-controlled communication with the cylinder ends and capable of piston-controlled communication with the interior of the piston through said port, a by-pass between the chambers, a valve in said by-pass and springs in said chambers acting upon opposite sides of said valve.

36. In a shock absorber, a cylinder, a hollow piston therein, valves at the ends of the piston, a port in said piston controlled by said cylinder, two by-pass chambers each capable of piston-controlled communication with the cylinder ends and capable of piston-controlled communication with the interior of the piston through said port, a by-pass between the chambers, a valve in said by-pass, springs in said chambers acting upon opposite sides of said valve and means for adjusting the tension of said springs.

37. A pivot joint comprising a hollow cylindrical member open at one end and a hollow cylindrical member open at one end and rotatable within and closing the first mentioned member, said second member forming a grease receiving receptacle within its interior and having lubricating passages through its sides for lubricating the contacting walls of the cylinders, and a bolt securing the cylinders in rotatable relation.

In testimony that I claim the foregoing as my invention, I have signed my name hereto.

JOSEF HOFMANN.